United States Patent [19]

Williams et al.

[11] Patent Number: 5,470,823

[45] Date of Patent: * Nov. 28, 1995

[54] STIMULATION OF COALBED METHANE PRODUCTION

[75] Inventors: Dennis A. Williams, Houston; James R. Looney, Brady, both of Tex.; Michael W. Conway, Marlow, Okla.; Robert A. Swenson, Janesville, Wis.

[73] Assignee: Exxon Chemical Patents Inc., Linden, N.J.

[*] Notice: The portion of the term of this patent subsequent to Jun. 21, 2011, has been disclaimed.

[21] Appl. No.: 56,674

[22] Filed: May 3, 1993

[51] Int. Cl.$^6$ ........................................ E21B 43/27
[52] U.S. Cl. ........................................ 507/241; 166/307
[58] Field of Search ........................................ 166/307, 308; 252/8.551, 8.553; 299/12; 507/240, 241

[56] References Cited

U.S. PATENT DOCUMENTS

| | | |
|---|---|---|
| 3,384,416 | 5/1968 | Ruehl . |
| 3,794,116 | 2/1974 | Higgins . |
| 3,934,649 | 1/1976 | Pasini, III et al. . |
| 4,883,122 | 11/1989 | Puri et al. . |
| 4,993,491 | 2/1991 | Palmer et al. . |
| 5,033,550 | 7/1991 | Johnson et al. . |
| 5,058,425 | 10/1991 | Davis, Jr. et al. . |
| 5,249,627 | 10/1993 | Harms et al. . |
| 5,322,630 | 6/1994 | Williams et al. ........... 252/8.553 |

*Primary Examiner*—Philip Tucker
*Attorney, Agent, or Firm*—R. L. Graham

[57] ABSTRACT

A coalbed formation is stimulated to improve the recovery of methane which involves injecting into the coalbed formation an aqueous acid solution containing an organic amphoteric tertiary ammonium compound having from 1 to 3 tertiary ammonium groups, each N of which contains at least one $C_3$ to $C_4$ unsaturated carboxylic acid group, and wherein the compound contains a terminal benzyl or $C_5$–$C_{19}$ alkyl group.

7 Claims, 1 Drawing Sheet

STIMULATION OF COALBED METHANE PRODUCTION

BACKGROUND OF THE INVENTION

This invention relates generally to the recovery of methane from coalbed deposits. In one aspect the invention relates to a method of recovering methane from coalbed deposits using a surfactant in acid treatments.

Coal seams contain a system of vertical fractures (cleats) that are typically water saturated. The bulk of the gas contained in the coalbeds is adsorbed on the internal surface of the coalbed matrix. The recovery of the methane gas from the formation generally involves producing formation water (dewatering) from the coal seams thereby reducing the reservoir pressure. Upon reduction of the reservoir pressure, methane gas desorbs and flows through the cleat network to the wellbore.

The recovery of methane from coalbed deposits is substantially different from the recovery of hydrocarbons from sandstone or limestone type formations. The lithology and mineralogy of the coalbed deposits are substantially different from sandstone and limestone. Also, the methane hydrocarbon is deposited in coalbed by adherence to the matrix of the coal or to the surfaces of the cleats; whereas in the sandstone and limestone formations, the hydrocarbon occupies the interstices of the formation. The production mechanisms are also different: In coalbed methane production, the methane is desorbed from the coalbed, whereas in the recovery of hydrocarbons from sandstone and limestone formations, the hydrocarbon is produced by merely tapping into the formation and reducing the formation pressure which causes the pressurized gas or oil to flow into the wellbore.

As mentioned above, desorbing methane from the coalbed formation, requires dewatering the cleats to reduce the pressure to a level which permits the methane to detach from the coalbed and flow into the cleats and the wellbore. Since the cleats generally contain calcite or carbonate deposits or coal fines which restrict the flow through the cleats, it is the general practice to treat coalbed formations by acidizing to dissolve these calcareous materials. It is also common to fracture coalbed formations to interconnect the cleats with a vertical fracture and thereby provide a flow path to the wellbore.

Efforts to improve the dewatering step have involved stimulation treatments using surfactants in the well treating fluid. For example, SPE Paper 23455 describes the tendency of coalbed reservoirs to become damaged as a result of stimulation or workover treatments and discloses the benefits of treatments with certain surfactants. The paper suggests the use of an additive identified as CBMA of Dowell Schlumberger, Inc. and also discloses that other commercially available additives may be used. One is identified merely as an oil wetting surfactant commonly used in conventional oil and gas reservoirs and another as a fluorocarbon surfactant.

European Patent Application 0,444,760 A1, assigned to Dowell Schlumberger, Inc., discloses a surfactant for the dewatering of coal seams and enhancing the recovery of methane therefrom. The surfactants include (a) ethylene oxide, butylene oxide substituted alcohol, (b) organic polyethylene carbonate substituted alcohols, (c) butoxylated glycols, and (d) ethoxylated-butoxylated glycols.

Other references which disclose the use of surfactant and the removal of water from filter cakes include polyoxyethylene ethers of hexatol and hydrite partial long chain fatty acid ester such as described in U.S. Pat. No. 2,864,765, oxyalkylated surfactants described in U.S. Pat. Nos. 3,194,758, 4,156,649, and 4,206,063, dialkyl sulphosuccinates described in U.S. Pat. Nos. 4,097,390 and 4,146,473, and fluorinated alkyl quaternary ammonium iodide surfactant described in U.S. Pat. No. 4,028,257. U.S. Pat. No. 4,842,065 discloses a number of oil wetting surfactants used in sandstone or carbonate formations for producing oil.

SUMMARY OF THE INVENTION

Figure 1:
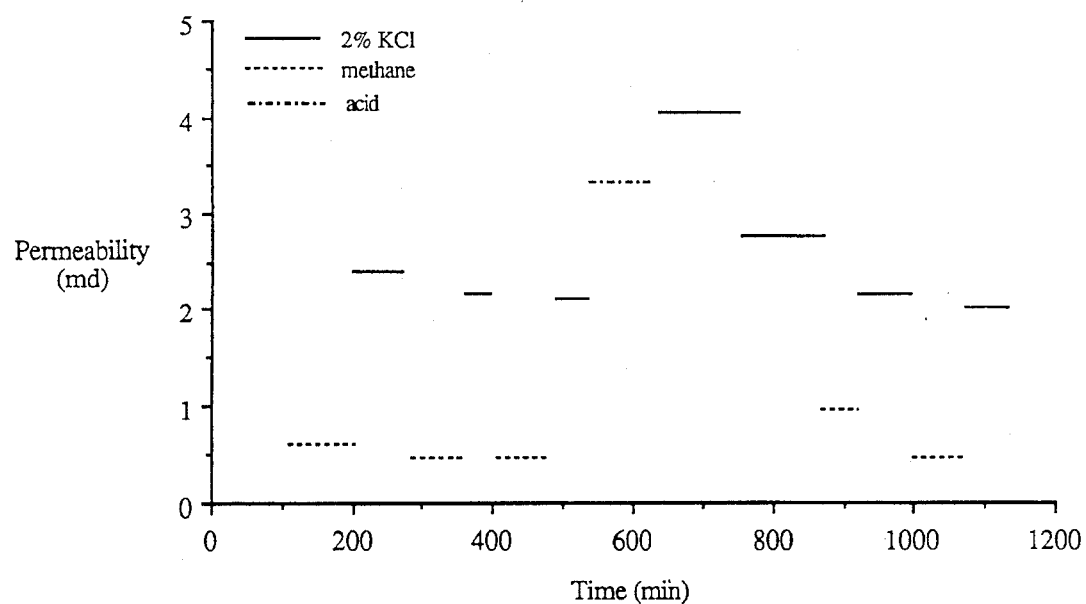
FIG. 1 is a plot of average stabilized permeability vs. time of injection into a core sample test cell showing the effects of injection on permeability without any surfactant in the fluids.

The method of the present invention involves the treatment of a methane containing coalbed formation with an aqueous treating liquid containing an amphoteric surfactant. The surfactant is an organic amphoteric tertiary ammonium compound (e.g. salt) having from 1 to 3 tertiary ammonium groups, wherein each group is bonded to a propanoic or 2-methyl propanoic acid group and wherein the compound has a terminal $C_4$–$C_8$ hydrocarbon group when the terminal group is bonded directly to N of the tertiary ammonium group and a terminal $C_5$ to $C_{19}$ alkyl hydrocarbon group when connected to a tertiary ammonium group through an imidazoline linkage. The preferred amphoteric surfactants have general formulas I and II as shown below:

Formula I

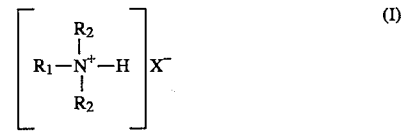

where:

$R_1$ is a benzyl or a $C_4$ to $C_8$ alkyl group;

$R_2$ is independently a propanoic group ($C_3H_4OOH$) or a 2-methyl propanoic group (2-$CH_3$—$C_3H_4OOH$); and $H^-$ is independently $Cl^-$, $HCOO^-$, $NH_2SO_3$, or $CH_3COO^-$.

Formula II

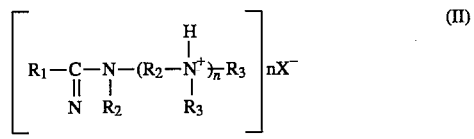

where:

n is an integer from 1 to 3;

$R_1$ is an alkyl $C_5$ to $C_{19}$ hydrocarbon;

$R_2$ is a $C_2H_4$ or $C_3H_6$ group;

$R_3$ is independently a propanoic group ($CH_3H_4OOH$) or a 2-methyl propanoic group (2-$CH_3C_3H_4OOH$); and $X^-$ is a described above for Formula I.

The surfactant useable in the method of the present invention thus comprises a hydrophobe (a $C_4$ to $C_{19}$ hydrocarbon group) and a hydrophile which includes at least one tertiary ammonium group, wherein the hydrophobe is bonded directly to the hydrophile (Formula I) or is bonded thereto through an imidazoline linkage (Formula II).

The amphoteric surfactant is employed in an aqueous acid solution, preferably having a pH equal to or less than 3.0. The method is carried out by injecting the aqueous acid solution containing the amphoteric surfactant into a coalbed formation, preferably at injection rates lower than that which would fracture for formation (i.e. at matrix injection rates). Tests have shown that the acid solution containing the amphoteric surfactant permits stimulation of the formation without damaging the formation. Although the mechanisms for the improved results are not fully understood, it is believed that the acid solution dissolves the calcareous material in the cleats and the amphoteric surfactant alters the wettability of the coal surface resulting in improved permeability to water and/or methane. The amphoteric surfactant alters the wettability of the coal from strongly oil wet to a neutral or slightly oil wet state.

DESCRIPTION OF THE PREFERRED EMBODIMENTS

In the recovery of methane from coalbed deposits, the flow passages through the coalbed formation are provided by a series of naturally occurring vertical fractures (cleats). The cleats extend in general parallel direction with some cross-fractures creating fluid communication between cleats. In formations where sufficient interconnected cleats occur, there is no need to artificially fracture the formation, but merely treat the formation with an acid solution to react with and remove calcareous deposits in the cleats. The acid stimulation improves the formation permeability for the water in the dewatering stage. When sufficient water has been produced from the formation through the interconnected cleats, the resultant reduced pressure permits the methane to desorb from the coalbed formation and flow into and through the interconnected cleats into the wellbore. However, as indicated above, acid treatments frequently resulted in little or no stimulation and sometimes even damages the formation.

It surprisingly has been discovered that by using certain amphoteric tertiary ammonium compounds (surfactants), the effects of the acid result in increased formation permeability to water and methane. Laboratory tests have shown that the treatments in accordance with the present invention do in fact stimulate dewatering and methane production.

The acids useful in the method of the present invention include all acids currently used in coalbed treatments such as HCl, mud acid (HCl/HF), nitric, sulfamic and the organic acids such as formic and acetic acid. The preferred acids are formic and HCl at concentrations in water of 5 to 15%.

The amphoteric compound includes from 1 to 4 tertiary ammonium groups, with each group bonded to a propanoic or 2-methyl propanoic acid group and the compound has a terminal $C_4$–$C_8$ group when only one tertiary ammonium group is present and a $C_5$ to $C_{19}$ alkyl group when two or more tertiary ammonium groups are present. The terminal groups are the hydrophobes of the surfactants and the hydrophiles include the tertiary ammonium groups.

The amphoteric surfactant has the general formulas shown above and identified as Formula I and Formula II.

The preferred compounds of Formula I have the following formula:

$[R_1 —N —(—C_2H_4—COOH)_2]^+ \ X^-$, where $R_1$ is an alkyl or benzyl group having from 4 to 8, preferably from 6 to 8 carbon atoms.

Specific Formula I compounds include [2-ethylhexyl-N — (—$CH_2CH_2$—COOH)$_2$]$^+$ $X^-$, (benzyl—NH —(—$CH_2CH_2$—COOH)$_2$]$^+$ $X^-$, [hexyl-N — (—$C_2H_2CH_2$—COOH)$_2$]$X^-$, (butyl-N —(—$CH_2CH_2COOH)_2$]$^+$ $X^{31}$ .

The Formula II surfactants are derived from the following compounds: reacting a $C_6$–$C_{20}$ fatty acid with a polyamine to form an imidazoline and then reacting the imidazoline with an unsaturated carboxylic acid (e.g. acrylic acid) to form a tertiary amine. Upon introducing the tertiary amine into an acid, the amino groups protonate to form a tertiary ammonium salt.

The hydrophobe is preferably provided by a hydrocarbon containing 12 to 20 carbon atoms, more preferably 16 to 20 carbon atoms. It is preferred that $R_1$ is the hydrocarbon residue of a naturally occurring fatty acid, which is optionally hydrogenated e.g. the residue of caproic, caprylic, capric, lauric, myristic, palmitic, stearic, palmitoleic, oleic, linoleic, or linolenic acid.

The molar ratio of the unsaturated carboxylic acid reacted with the imidazoline (Formula II) is selected to provide the desired level of substitution.

The surfactants useable in the present invention are readily prepared from commercially available compounds.

An example of Formula I is prepared by reacting a monoamine such as hexyl or benzyl amines with acrylic acid to form a tertiary amine:

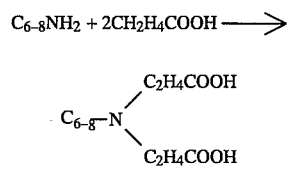

Upon protonation in the acid, the cation is formed.

An example of Formula II is prepared by reacting a tall oil fatty acid with a polyamine such as diethylenetriamine to form an imidazoline:

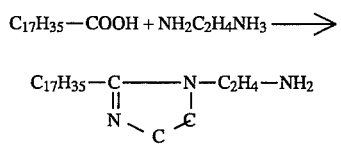

The subsequent reaction of the imidazoline with acrylic acid forms the tertiary amine

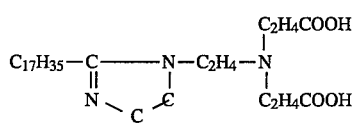

In carrying out the method of the present invention, the surfactant is introduced into the acid solution at a concentration of 0.1 to 2.0 wt %, with 0.2 to 1.0 wt % being preferred. The acid solution may be HCl, HCl/HF, acetic acid, formic acid, or sulfamic acid, with formic acid being preferred. The treating solution may include other additives such as scale chemicals, non-emulsifying agents, and corrosion inhibitors. The volume treatment may be within a wide range, with from 10 to 200 (typically 50) gallons per foot of formation treated being sufficient for most treatments. The injection pressure and rate preferably are below that which would fracture the formation.

Generally the procedure for treating the well will involve the following steps for new wells:

(a) Fill the well bore with water or 2% KCl water if fluid level is low.

(b) Inject acid treatment at matrix rates and pressures; acid treatment contains dewatering amphoteric surfactant, non-emulsifying agent (if needed), scale chemical, and corrosion inhibitor, etc. Displace to perforations with water/2% KCl.

(c) Flow or pump well to remove treatment fluids and begin removal of formation water.

(d) When methane gas is produced at economic levels, flow to water/gas separator and send gas to pipeline.

For workover treatments, the procedure is generally the same except the well is killed with acid, preferably 10% solution of formic acid containing the amphoteric surfactant and other additives such as scale inhibitor, non-emulsifying agent, corrosion inhibitor, etc.

EXPERIMENTS

Core Samples

Coal samples representative of the producing formation are exceedingly difficult to obtain for core flow studies. Core library samples of unpreserved coal typically cannot be used for core flow studies because the competency of a coal sample is primarily related to the method in which it was handled after it was obtained. Unpreserved core can change chemically from its reservoir state. If the sample is allowed to dry, it becomes much more friable and, secondly, the coal surface becomes altered due to oxidation.

Since it is necessary to perform core flow studies on samples which are representative of the native coal, guidelines need to be followed to insure that core samples obtained are properly preserved. In extremely friable seams such as those found in some formations, conventional coring efforts have very limited success in core retrieval. However, the use of a special coring rig has had reasonable success in the recovery of a 1.875 in. diameter core.

After retrieval, the core samples were placed in PVC pipe containing formation water. The samples were then frozen to dry ice temperatures. This accomplishes two things: (1) it provides mechanical stability to the core for shipping, and (2) it limits the exposure of the core surface of oxygen. In the laboratory, the coal can be retrieved in the frozen state by cutting the plastic away from the core and drilling core plugs using liquid nitrogen as the cooling medium. While still frozen, the core plug is trimmed and loaded in a Hassler sleeve and there it is allowed to thaw under confining pressure.

Since there is a general lack of properly preserved coal core samples, mined samples are often used in testing. Mined samples need to be taken as close to the mining action as is possible to minimize the effects of oxidation and dehydration. The samples then need to be placed either in formation water, a synthetic brine composition similar to produced water, or 2% KCl. This prevents the core from drying. Experience has shown that samples can be successfully transported in water filled containers with very little evidence of mechanical or chemical alteration. The coal samples are immersed in water with a shock absorber, such as sheets of ½ in. to 1 in. foam rubber, separating the layers.

Test Apparatus

A Hassler sleeve core holder was adapted to receive a 1"×1½" core so that fluid can be injected in both axial directions through the core. The perimeter of the core was confined. The injection of fluid in one direction simulates injection of fluids into a formation and injection in the opposite direction simulates production from the formation. Pumping, flowline, and temperature control facilities were provided to control injection into the space between the cores, leak off from the cores, and temperature of the core and fluids.

A manifold was constructed so that both fluids can be injected in the production direction to determine the base permeability and fluids can be injected in the injection direction (opposite that of the production direction). The core confining stress is initially set at 650 psi and the back pressure is set at 400 psi to maintain a net confining stress of 250 psi. Confining stress can be raised to reduce the permeability to the desired permeability range if it is too high. Fluid flow rates are set with a Bechman dual piston chromatography pump pumping oil into a displacement cylinder containing brine or treating fluid. The brine flow rate is monitored by using a digital balance to continuously weigh the fluid exiting the back pressure regulator. The methane flow rate is controlled with a Nupro metering valve and the flow rate measured with a Fisher or Teledyne flow meter after it passes through a brine/gas separator. A standard sweep of permeability vs flow is periodically taken at atmospheric flow rates of 0.098 to 0.3 L/min and the permeability reported at the reference rate of 0.098 L/min. At 400 psi pore pressure, the gas flow rate in the core is 3.1 to 9.7 ml/min. The pressure drop down the core is recorded using Validyne D15 pressure transducers with the signals processed through a MCl-20 and DA 380 acquisition system. The date is recorded at preset time intervals on a PC computer using Workbench® data acquisition software. The date is imported into a Quattro Pro Spreadsheet and processed.

Comparison Experiment

Tests were carried out to determine the effects of acids on the relative permeability of the coal samples from Blue Creek.

After filling the core with 2% KCl, the injections into the cell were as follows:

| Step | Injected Fluid | Direction | Avg. Stabilized Perm. |
| --- | --- | --- | --- |
| Step 1 | Methane | Production | 0.5 |
| Step 2 | 2% KCl | Production | 2.4 |
| Step 3 | Methane | Production | 0.3 |
| Step 4 | 2% KCl | Production | 2.2 |
| Step 5 | Methane Injected | Production | 0.3 |

| Step | Fluid | Direction | Avg. Perm. |
| --- | --- | --- | --- |
| Step 6 | 2% KCl | Production | 2.3 |
| Step 7 | 10% formic | Injection | 3.2 |

|          | acid    |            |     |
|----------|---------|------------|-----|
| Step 8   | 2% KCl  | Injection  | 4.0 |
| Step 9   | 2% KCl  | Production | 2.8 |
| Step 10  | Methane | Production | 0.8 |
| Step 11  | 2% KCl  | Production | 2.1 |
| Step 12  | Methane | Production | 0.4 |
| Step 13  | 2% KCl  | Production | 2.0 |

The intermittent injection into the test cell simulated methane production from a coal seam. From FIG. 1 it can be seen that formic acid produced a temporary but dramatic increase in the relative permeability to brine (2% KCl). Because there was no effect or generally little if any significant effect on the relative permeability to methane, and the effect disappeared on repeated brine and gas injections, it was felt that this was indeed a relative permeability effect and not a general increase in the absolute permeability. Because the acid did have a significant effect on the absolute permeability in some samples, it required that tests be duplicated and triplicated in order to statistically draw these conclusions. FIG. 1 is representative of these tests.

Similar effects were seen in tests with sulfamic and acetic acid.

Additional tests were carried out to determine the effects of adding the amphoteric surfactant described herein to the acid solution. The surfactants tested are shown in TABLE I:

TABLE I

| Sample | Composition | Formula |
|--------|-------------|---------|
| A | [2-ethyl hexyl-$N^+$—(—$CH_2$—$CH_2$—COOH)$_2$]$HCOO^-$ | I |
| B | [isodecyl —$N^+$(—$CH_2CH_2$—COOH)$_2$]$HCOO_1$ | — |
| C | [benzyl —$N^+$(—$CH_2CH_2$—COOH)$_2$]$HCOO^-$ | I |
| D | TOFA/TEPA imidazoline + acrylic acid | II |
| E | TOFA/TETA imidazoline + acrylic acid | II |

The formulas of A, B, and C are presented in TABLE I.

Sample D was prepared by reacting 1 eq. of Tall oil fatty acid (TOFA) with 1 eq. tetra ethylene penta amine (TEPA) to form an imidazoline which was then reacted with 4.5 eq. acrylic acid. The active ingredient was 50% by wt. in sec-butyl alcohol solvent. The formula in the treating acid was as follows:

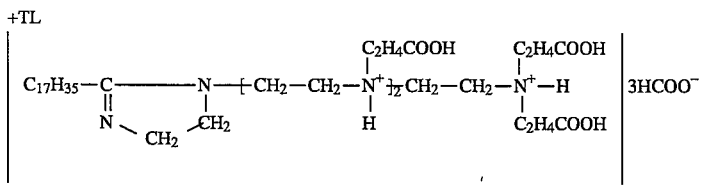

Sample E, also contained in a 50% active solvent, was prepared by reacting 1 eq. TOFA and 1 eq. TETA to form imidazoline which was reacted with 3.5 eq. of acrylic acid. The formula was similar to the Sample D formula, but contained two tertiary amine groups.

EXPERIMENTS I & II

Two treatments were carried out on a Blue Creek coal sample using the test apparatus. In the first treatment (I) 0.5 wt % of the Sample A surfactant was added to the 2% KCl solution (Step 3). In the second treatment (II), the Sample A additive was added to the 10% formic acid solution at the same concentration. The injection through the cell was as follows:

| Treatment | Step | Injected Fluid | Direction | Avg. Perm. |
|-----------|------|----------------|-----------|------------|
| I  | 1 | Methane     | Production | 2.5  |
| I  | 2 | 2% KCl      | Production | 8.5  |
| I  | 3 | 2% KCl      | Injection  | 9.0  |
| I  | 4 | Methane     | Production | 2.0  |
| II | 5 | 2% KCl      | Production | 6.1  |
| II | 6 | Formic acid | Injection  | 12.2 |
| II | 7 | 2% KCl      | Production | 17.0 |
|    | 8 | Methane     | Production | 7.0  |

Figure 2:
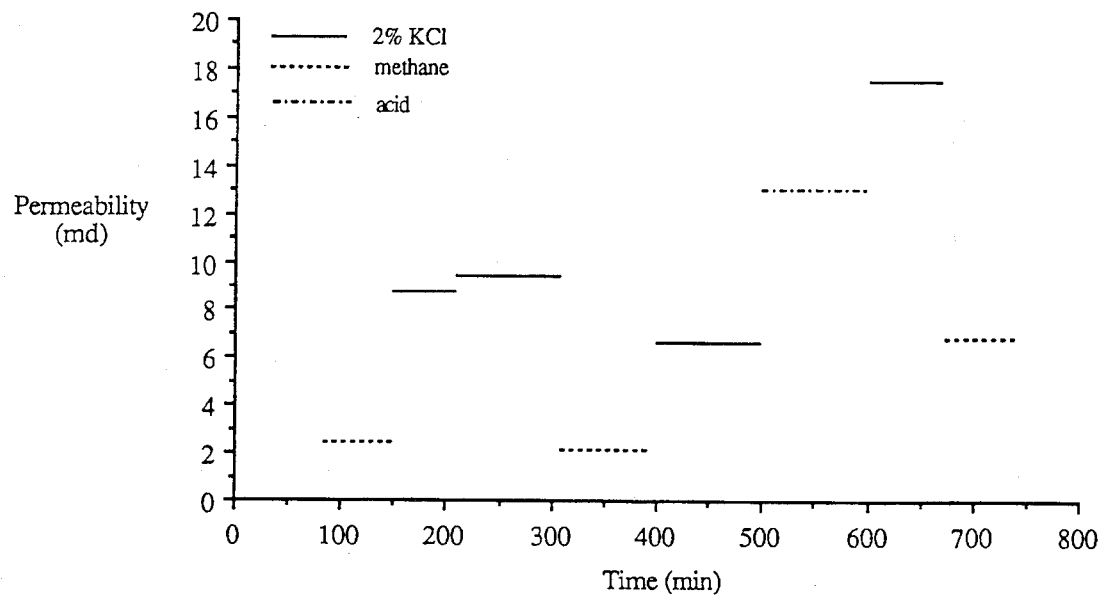
FIG. 2 is a plot similar to FIG. 1 illustrating the effects of the treatment of coalbed methane formation when treated by the method of the present invention.

From the above data, graphically presented in FIG. 2, Sample A resulted in a 250% increase in methane permeability when added to the formic acid, but had no effect when added to the KCl solution. These tests were repeated several times with the same results.

EXPERIMENT III

Tests similar to the tests carried out in Experiments I and II using an alkali surfactant (Sample B) revealed that the hydrophobic R group ($C_{10}$) was not effective in improving the permeability to either the KCl solution or methane. These tests thus reveal that the $R_1$ group of Formula 1 must be less than 10 C atoms (e.g. from 4 to 8 carbon atoms).

EXPERIMENT IV

A test similar to Tests I and II was carried out using surfactant A, on Utley coal samples. The results showed that the treatment with Surfactant A in the formic acid produced an increase in 2% KCl permeability and methane permeability of 70% and 100%, respectively.

EXPERIMENTS V and VI

Additional tests were carried out using the procedure described above. These test results, along with the results of the base case (without any additive), and tests I, II, and III are summarized in Table II. (Except for Experiment I, the surfactant was in the acid solution.

TABLE II

| Experiment | Surfactant | Acid | Coal Sample | % Increase in permeability | |
|---|---|---|---|---|---|
| | | | | KCl Soln. | Methane |
| Base | — | Formic | Blue Creek | (−) | (−) |
| I | A | Formic | Blue Creek | (−) | (−) |
| II | A | Formic | Blue Creek | 100 | 250 |
| III | B | Formic | Blue Creek | (−) | (−) |
| IV | A | Formic | Utley | 70 | 100 |
| V | C | Formic | Blue Creek | 50 | 50 |
| VI | D | Formic | Blue Creek | 25 | 0 |

The above experiments demonstrate the effectiveness of the amphoteric surfactants in stimulating both water production and methane production in coalbed formations. In addition, as described in assignee's copending application U.S. Ser. No. 962,494, filed Oct. 15, 1992, the compounds exhibit corrosion protection properties for acids used in contact with well tubulars and other ferrous metals. The disclosure of U.S. application Ser. No. 962,494 is incorporated herein by reference.

What is claimed:

1. A method of recovering methane from a coalbed formation which comprises injecting into the formation an aqueous acid solution containing an effective amount of an organic tertiary ammonium surfactant having the following formula:

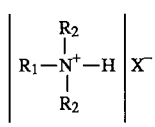

where $R_1$ is independently a benzyl group or $C_4$–$C_8$ alkyl group;

$R_2$ is independently a propanoic or 2-methyl propanoic acid group; and

X is independently Cl, HCOO, $NH_2SO_3$ or $CH_3COO$.

2. The method of claim 1 wherein the acid solution has a pH of 3 or less.

3. The method of claim 1 wherein the acid solution is an aqueous solution of HCl, formic or acetic acid.

4. The method of claim 1 wherein the aqueous acid solution containing the surfactant is injected into the formation at a pressure below the fracturing pressure of the formation.

5. The method of claim 1 wherein the concentration of the acid in the acid solution ranges from 5 to 15 wt %.

6. The method of claim 3 wherein the acid solution is selected from the group consisting of HCl and formic acid.

7. The method of claim 1 wherein the $R_1$ is a $C_6$ to $C_8$ group.

* * * * *